CRYOGENIC ASSOCIATIVE MEMORY

Filed Sept. 27, 1962 2 Sheets-Sheet 1

INVENTOR
JOHN W. BREMER
BY
Samuel E. Turner
ATTORNEY

INVENTOR.
JOHN W. BREMER
BY
Samuel E. Turner
ATTORNEY

United States Patent Office 3,321,746

Patented May 23, 1967

3,321,746

CRYOGENIC ASSOCIATIVE MEMORY

John W. Bremer, Sunnyvale, Calif., assignor to General Electric Company, a corporation of New York Filed Sept. 27, 1962, Ser. No. 226,517

13 Claims. (Cl. 340—172.5)

This invention relates to cryogenic electronic memory devices and particularly to a word-organized associative or data-addressed memory system wherein words are addressed by content rather than by location.

Certain electrical conductors are known to exhibit a loss of electrical resistance at supercold temperatures approaching absolute zero and to regain resistance in the presence of a certain "critical" magnetic field. The critical field depends upon the particular superconductive material as well as its temperature. Superconductive materials requiring comparatively high critical magnetic fields are known as "hard" superconductors while those requiring comparatively low critical magnetic fields are known as "soft" superconductors.

Superconductors can be used to form a cryotron or superconductive switch. In the preferred thin-film form the cryotron comprises a gate conductor film of soft superconductive material which is crossed by a narrow control conductor film insulated therefrom and preferably formed of hard superconductive material. Both the gate conductor and the control conductor are thus normally in the superconducting state. If sufficient current is caused to flow through the control conductor the resulting magnetic field causes the gate conductor to become resistive in the region of the crossover.

Because of low heat losses, cryogenic devices of the thin-film form may be greatly miniaturized and many cryotron elements can be contained in a small volume. Thus cryotron elements are well adapted to the formation of large capacity computer memory units.

In conventional computer memory systems discrete blocks of data or data words are stored at sequentially numbered locations or addresses. To enter a data word into the memory of such a system an address is assigned. The assigned address is then selected by an address register and selection circuit. To retrieve or read out a data word from such a system the address at which the word is stored must ordinarily be known or a lengthy word-by-word search performed.

For certain data-processing problems it is desirable to read or retrieve stored words on the basis of their content rather than their location. To reduce searching time it is also desirable to interrogate all of the stored words substantially simultaneously. It is further desirable to retrieve a stored word in response to an interrogation of selected parts of the word. For example, in a data processing system the data words may contain certain information concerning employees such as the number of years of service, social security number and salary as well as other data. It may be desirable to retrieve an entire word in response to an interrogation for only the number of years of service, that is, it may be desirable for example, to retrieve the records of all employees having a given number of years of service. This gives rise to the problem of multiple comparisons, that is, more than one data word in the memory matches the interrogation word. It is desirable to make each such matching word available in sequence, that is, it is desirable to inhibit readout of all but the first matching word. After the desired operations are performed on the first word, the second word is read out, the read-out of all others being inhibited, and so forth.

A memory system which performs the above-described operations is disclosed by Pierre H. Boucheron, Jr., in a copending U.S. patent application Ser. No. 127,459, filed July 25, 1961, now Patent No. 3,241,123, issued Mar. 15, 1966 entitled "Data Addressed Memory" which is assigned to the same assignee as the present invention. In the system therein disclosed a selection logic or "ranking" circuit cooperates with the memory matrix to inhibit all except one of multiple interrogation responses according to a predetermined order. Such a selection logic circuit, while achieving the desired result, becomes quite large where a memory for storing a very large number of words is required. It is therefore desirable to provide an associative memory comprising improved bit storage cells and having a simplified selection logic circuit.

It is therefore an object of the invention to provide an improved bit storage cell for an associative memory system.

Another object of the invention is to provide a simplified selection logic circuit in an associative memory system.

Another object of the invention is to provide an improved associative memory wherein all words stored in the memory or any selected portion thereof may be interrogated substantially simultaneously.

Another object of the invention is to read out in sequence a plurality of stored words which match an interrogation word.

These and other objects of the invention are achieved by providing a memory matrix comprising rows and columns of persistent current storage cells, each row of cells providing storage for a word. The selection logic circuit includes a pair of flip-flops, a "match-indicating" flip-flop and a "selection" flip-flop, for each row of storage cells (that is, for each word). During a search or interrogate operation current in an "associative" line in each row is diverted to a "shunt" line for each word that fails to match the interrogation word. The diverted current resets the match-indicating flip-flop of the corresponding row to indicate the mismatch. In a row containing a matching word the current continues to flow through the associative line and the state of the match-indicating flip-flop of that row remains unchanged to indicate a matching word.

A select operation is now performed by applying a select current pulse to a select line through the selection logic circuit. When the select current encounters the match-indicating flip-flop of the first row which contains a matching word the select current is diverted to a "bypass" line through a cryotron which sets the selection flip-flop of that row. In its set state the selection flip-flop enables the read and write lines in that row so that reading and/or writing operations can be performed. Since the select current is diverted to the bypass line only the first matching word is selected.

When reading and/or writing operations are performed on the first matching word, the reading or writing current resets the match-indicating flip-flop so that this word will not be selected again. When the reading and/or writing operations are completed on the first matching word, another select current pulse is applied to select the second matching word. Thus in the present system the first matching word is selected in response to the first select current pulse, the second matching word is selected in response to the second select current pulse, and so forth. After all matching words have thus been selected in sequence, an "end" cryotron in the select line is resistive in response to a select current pulse thus providing an indication that the system is ready for another search. Thus a simplified associative memory system is provided wherein reading and writing is enabled directly by the selection circuit and wherein similar selection structure is employed for each word.

The structure organization and operation of the invention is described more specifically in the following detailed description with reference to the accompanying drawings in which.

Figure 1:
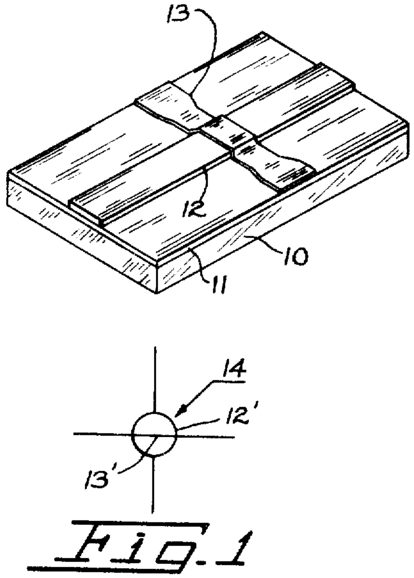
FIGURE 1 is a perspective view of an example of the structure of a thin-film cryotron together with a schematic symbol thereof.

Shown in FIG. 1 is an example of the structure of the thin film form of a basic cryotron or superconductive switching element. Thin film cryotron circuitry is ordinarily formed on a flat base or substrate such as a substrate 10, FIG. 1. A substrate is ordinarily formed of an insulating material having a smooth surface such as glass. In order to decrease circuit inductance it is preferable to provide a superconductive shield plane 11 underlying the cryogenic circuitry. The shield plane 11 may be formed of a thin film of hard superconductive material such as lead. A layer of insulating material such as silicon monoxide, not shown, is formed over the shield plane 11 to insulate the subsequently formed structure therefrom.

The active portions of the cryotron comprise a gate conductor 12 hereinafter referred to as a "gate" which is crossed by a control conductor 13 hereinafter referred to as a "control." The control 13 is insulated from the gate 12 by a film of insulating material such as silicon monoxide. The gate 12 is formed of soft superconductive material such as tin while the control 13 is formed of a hard superconductive material such as lead. Thus the magnetic field resulting from a sufficient current flow in the control 13 causes the gate to become resistive in the region of the cross-over while the superconductivity of the hard superconductive material of a control 13 is not destroyed. Thus the cryotron comprises a two-state device, that is, the gate is superconductive in the absence of a current in the control and the gate is resistive in the presence of a current in the control which exceeds a predetermined design threshold.

Also shown in FIG. 1 is a schematic symbol 14 which is used herein to represent a cryotron. The gate is represented by a circle 12' and the control by a line 13' crossing the circle. (A more detailed discussion of cryotrons is given by John W. Bremer in "Superconductive Devices," chapter 2, McGraw-Hill Book Company, Inc., New York, 1962.)

Preliminary to the description of the associative memory of the invention, the structure and operation of the bit storage cell of the invention will be described.

The storage cell includes a cryotron controlled superconductive loop in which a persistent circulating current can be established to represent a bit of information. Binary information can thus be stored by the cell according to the direction of the persistent current. According to the convention followed in the present description the cell is considered to be storing a binary "1" when the persistent current is flowing clockwise in the loop and a binary "0" when the persistent current is flowing counterclockwise.

Figure 2:
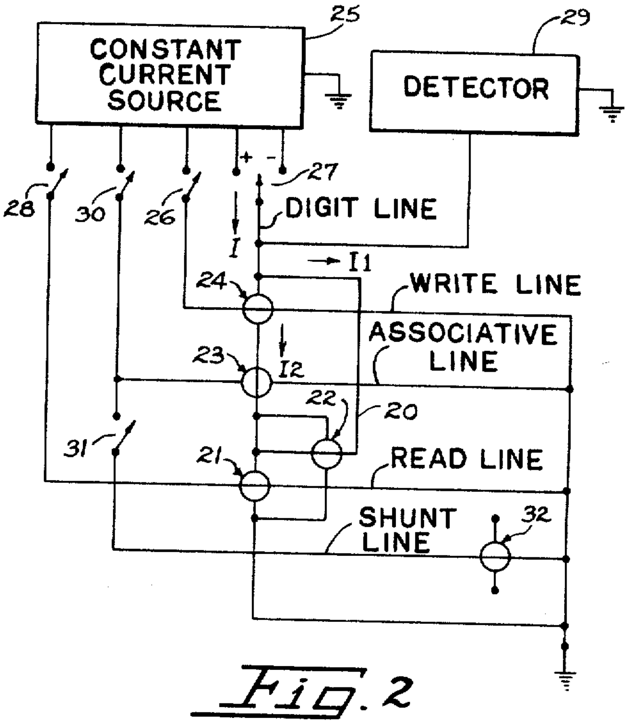
FIGURE 2 is a schematic diagram of the storage cell of the invention.

The associative memory storage cell is shown in FIG. 2. Structure is provided for writing in the cell, that is, for establishing a persistent current in a selected direction in a persistent current loop, for reading from the cell, that is, for detecting the direction of a stored persistent current, for interrogating the cell, that is, for comparing an applied bit representing indication with the bit representing state of the cell, and for indicating the result of the interrogation.

The storage cell includes four cryotrons 21–24, a branch circuit 20, a digit line, a write line, an associative line, a read line and a shunt line. A persistent current loop is formed by branch circuit 20, the gate of cryotron 24 and the control of cryotron 23, the branch circuit 20 including the control of cryotron 22. A constant current source 25 supplies currents for circuit operation. The source 25 supplies currents of unit magnitude, a current of unit magnitude being defined as at or above the cryotron control threshold value, that is, a current of unit magnitude through the control of a cryotron renders the gate of the cryotron resistive.

The persistent current loop provides two parallel paths for a digit current I, a first path through the branch circuit 20, current therein being designated a current I1, and a second path through the gate of cryotron 24 and the control of cryotron 23, current in this second path being designated a current I2. ("Downward" currents are considered positive herein while "upward" currents are considered negative.) The cell is preferably constructed so that the inductance of the I1 and I2 current paths are equal.

Figure 3:
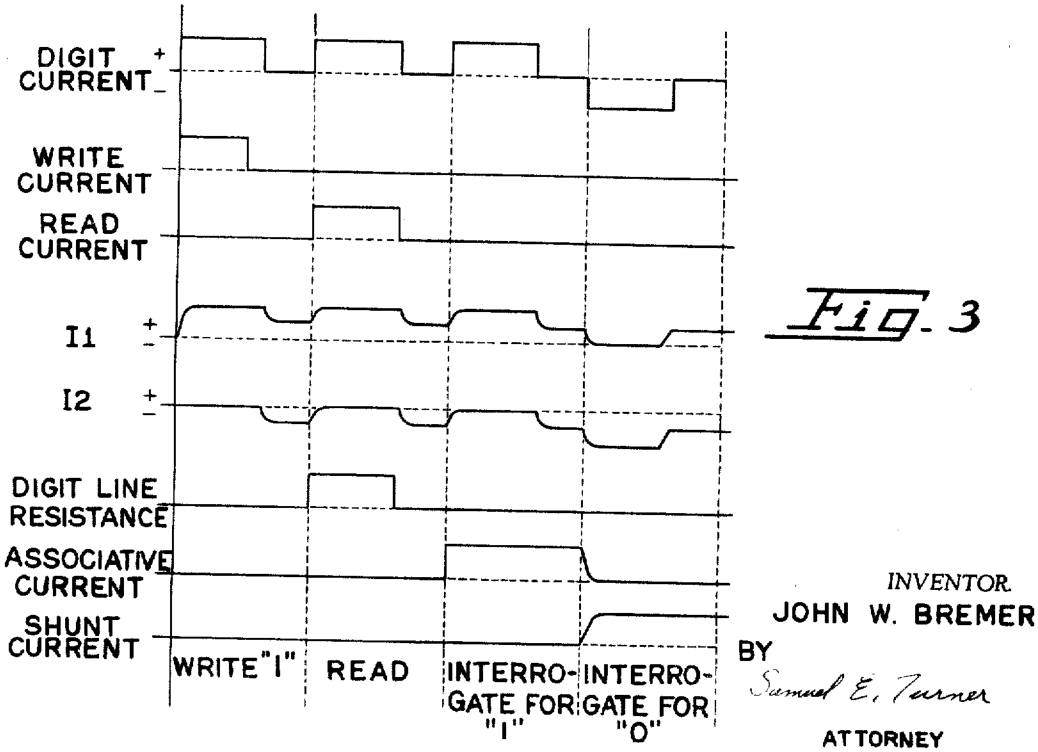
FIGURE 3 is a diagram of waveshapes illustrating the operation of the storage cell of FIG. 2.

Operation of the storage cell of FIG. 2 is shown by the following examples with reference to FIG. 3 which illustrates waveshapes of circuit operation. A write operation is illustrated in the first or left column of FIG. 3. To write a "1," that is, to establish a clockwise persistent current in the storage cell, a positive (downward) digit current I is applied, by means of a switch 27 for example, to the digit line, the current I being of unit magnitude. At the same time a current of unit magnitude is applied to the write line by closing a switch 26. A current in the write, associative, read or write lines is designated a "word current." The word current applied to the write line flows through the control of cryotron 24 and the magnetic field due to this current renders the gate of cryotron 24, and therefore the I2 current path, resistive. Since the branch circuit 20 (the I1 current path) remains superconductive, substantially all of the applied digit current flows therethrough. Thus for practical purposes the current I1 is equal in magnitude to the current I and the current I2 is zero as shown in the first column of FIG. 3. The word current in the write line is now turned off allowing the gate of cryotron 24 and therefore the I2 current path to become superconductive. The digit current I is then turned off. The stored energy due to the inductance of the branch circuit 20 forces negative (upward) current flow in the now superconductive I2 current path and a persistent current comprising currents I1 and −I2 is thus established in the loop. The magnitude of the persistent current is less than the magnitude of the applied digit current because of the inductance encountered in the I2 current path. When the cell is constructed so that the inductances of the I1 and I2 current paths are equal, the magnitude of the stored persistent current is substantially one-half the magnitude of the applied digit current, that is, one-half unit magnitude. Thus I1 equals ½I equals −I2 for a clockwise persistent current representing a stored "1." This is illustrated in the first column of FIG. 3 by the waveshapes of currents I1 and I2 after the conclusion of the digit current pulse. (I2 is indicated as negative since for a clockwise persistent current in the loop the I2 current flow is upward.)

The writing of a "0," that is, the establishment of a counterclockwise persistent current, is not illustrated in FIG. 3 since the operation is similar to the writing of a "1" as described above with the difference that a negative instead of a positive digit current is applied. Thus in the case of a stored "0" the established persistent current comprises the currents −I1 and I2.

The second column of FIG. 3 illustrates a read operation, that is, the detection of the direction of a persistent current in the loop. A word current is applied to the read line by closing a switch 28 and a positive digit current I is applied to the digit line. The read line includes the control of cryotron 21 and thus the word current in the read line renders the gate of cryotron 21 resistive. Because the I1 and I2 current paths are both superconductive, the applied digit current divides in inverse proportion to the inductances of the two paths. Since the inductances are equal in the present illustrative embodiment, the digit current divides equally, thus adding or subtracting a current of one-half unit magnitude to or from the currents I1 and I2, as the case may be. In the case of a stored "1" the loop current is clockwise and thus the digit current adds to the persistent current in the I1 current path and subtracts from the persistent current in the I2 current path. Thus, as illustrated in the second column of FIG. 3, when the digit current is applied the current I1 is of unit magnitude. This current through the control of cryotron 22 renders the gate of this cryotron resistive. Because the gate of cryotron 21 is also resistive due to the word current in the read line, the digit current encounters resistance in the digit line. The voltage drop due to this encountered resistance may be detected, for example, by a voltage detector 29 connected to the digit line, to indicate a stored "1."

The reading a stored "0," that is, the detection of a counterclockwise persistent current, is not illustrated in FIG. 3. In such a case the applied digit current adds to the current in the I2 current path and subtracts from the current in the I1 current path. Thus the current I1 becomes substantially zero and the control of cryotron 22 and therefore the digit line remains superconductive, the consequent absence of resistance to the digit current being indicative of a stored "0."

As mentioned hereinbefore, the storage cell of FIG. 2 includes interrogation structure for providing an indication of whether or not the bit stored in the cell matches an interrogation bit. To perform an interrogate operation a switch 30 is closed to apply a word current to the associative line which includes the gate of cryotron 23. A switch 31 is then closed thus placing the shunt line in parallel with the associative line and providing an alternate path for the word current. It is noted however that the word current continues to flow in the associative line at this time. This is according to the principle that if a current is established in one of a plurality of parallel superconducting paths, it will continue to flow in that path to the exclusion of the other paths until a resistance or other influence is imposed to divert the current. It is also noted that the stored persistent current in the loop flows through the control of cryotron 23. It will be recalled that the stored persistent current has a magnitude of one-half unit current. Thus in order to prevent this current from making the gate of cryotron 23, and hence the associative line, resistive the cryotron 23 is designed to have a control current threshold of greater than one-half unit current.

The third column of FIG. 3 illustrates an interrogation for a "1" when the storage cell contains a "1." To interrogate for a "1" the switch 27 is closed to apply a positive digit current to the digit line. In other words, in an interrogate operation an applied positive digit current represents a "1" interrogation bit. The applied digit current divides as described hereinbefore in the description of a read operation. Since the persistent current is clockwise to represent a "1," the digit current adds to the persistent current in the I1 current path and subtracts in the I2 current path. Thus during the application of the digit current the current I2 is substantially zero. Therefore the gate of cryotron 23 remains superconductive and the word current continues to flow in the associative line thus indicating a match or identity between the "1" interrogation bit and the "1" stored bit.

The fourth column of FIG. 3 illustrates the interrogation for a "0" when the storage cell contains a "1." To interrogate for a "0" a word current is established in the associative line and the switch 31 is then closed as described above. The switch 27 is then closed to apply a negative digit current to the digit line, an applied negative digit current representing a "0" interrogation bit. This upward flowing digit current divides between the two paths of the persistent current loop thus adding to the upward persistent current in the I2 current path making a total current of unit magnitude in this path through the control of cryotron 23. The gate of cryotron 23 thus becomes resistive. This causes the word current to be diverted from the associative line to the shunt line to thus indicate a mismatch or lack of identity between the "0" interrogation bit and the stored "1" bit. A cryotron 32 may be provided to sense the presence of the word current in the shunt line.

The cases of interrogation for a "1" and a "0" when the storage cell contains a "0" are not illustrated in FIG. 3. Operation in these cases is believed to be readily deducible from the above described examples. In summary, when the stored bit matches the interrogation bit, the gate of cryotron 23 remains superconductive and the word current remains in the associative line. When the stored bit is different from the interrogation bit, the gate of cryotron 23 is rendered resistive and the word current is diverted to the shunt line.

Figure 4:
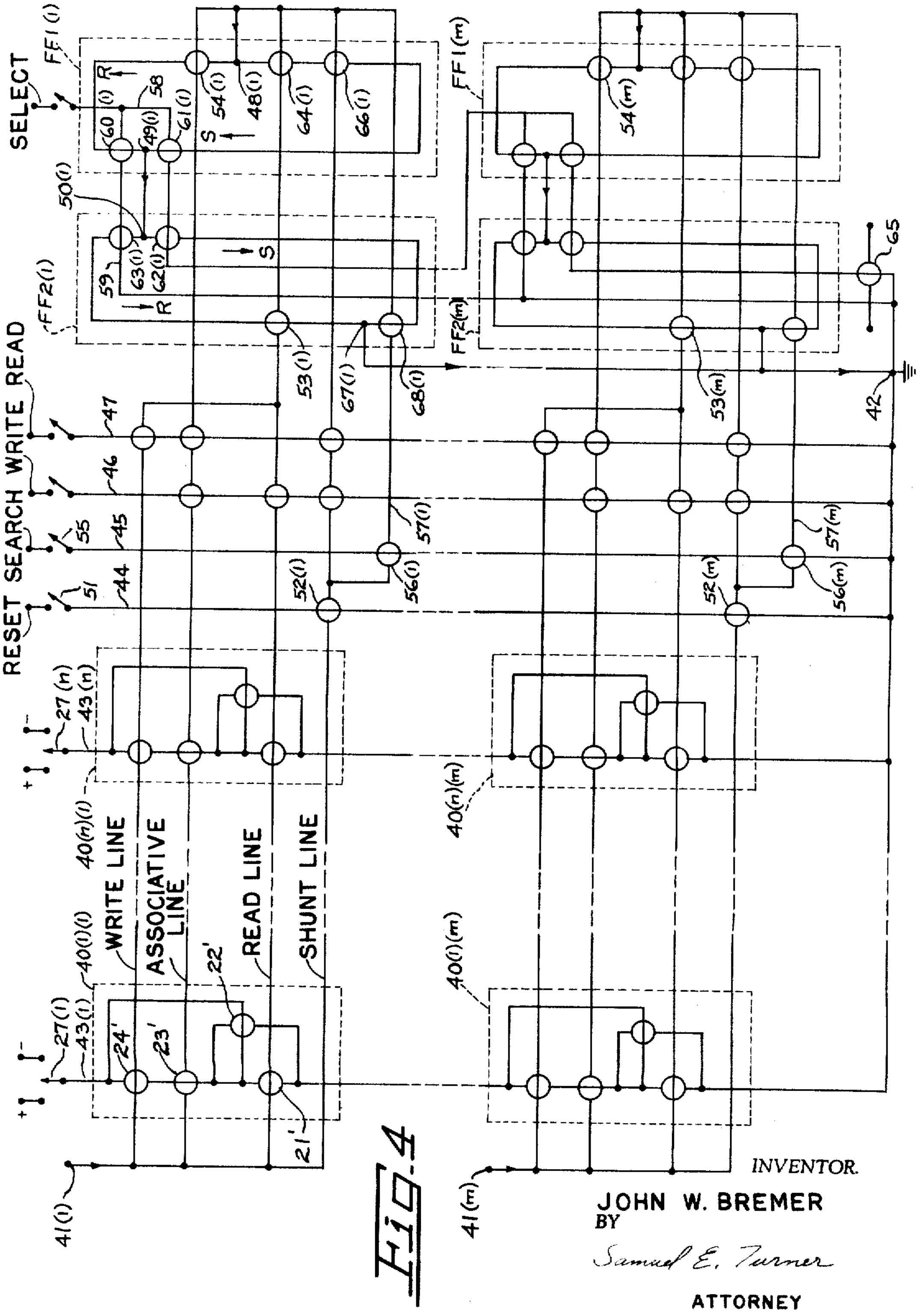
FIGURE 4 is a schematic diagram of an embodiment of the associative memory system according to the invention.

An embodiment of an associative memory system according to the invention is shown in FIG. 4. The storage portion of the system is formed of rows and columns of the bit storage cells of the kind shown in FIG. 2 and described above. For read or write operations the memory is word-organized, that is, all of the digits or bits of one word are written or read at the same time. In interrogate or search operations all bits, or selected bits, of all words are interrogated simultaneously. A selection circuit comprising a pair of flip-flops in each row indicates the matching words and controls the sequential selection of the matching words in response to select current pulses.

The storage portion of the system includes a plurality of bit storage cells 40(1)(1)–40$(n)(m)$ arranged in $m$ rows and $n$ columns. Thus a first row includes storage cells 40(1)(1)–40$(n)$(1) and a first column includes storage cells 40(1)(1)–40(1)$(m)$. Each row of storage cells stores a word, the digit or bit positions corresponding to the columns. To simplify the drawing only the four "corner" cells of the resulting two-dimensional array are shown. For convenience of identification, similar reference numbers are applied to the cryotrons 21'–24' of the storage cell 40(1)(1) as are applied in FIG. 2.

Each row or word position includes write, associative, read and shunt lines, referred to collectively as row lines, which form alternative current paths for the word current applied to a respective terminal 41(1)–41$(m)$ each of which is connected to a constant current source.

Each column or bit position includes a respective digit line 43(1)–43$(n)$ each connected between a respective digit switch 27(1)–27$(n)$ and a return terminal 42. Each switch 27(1)–27$(n)$ is operable to connect its digit line to a source of "positive" or "negative" digit current or the switch may be left open to prevent interrogation of that bit position, that is, to "mask" the interrogation. An interrogation word is thus represented by the states of these digit switches. Thus a switch closed to allow a downward or positive current represents a "1" bit or digit, a switch closed to allow an upward or negative current represents a "0" bit and an open switch represents a masked bit.

A plurality of control lines 44–47 receive currents to control cryotrons in the row lines to thus control the various system operations of reset, search (or interrogate), write and read.

A selection circuit is provided for selecting one of the rows (words) at a time in response to a match between the word stored in the row (or a selected portion thereof) and the interrogation word as represented by the states of the digit switches 27(1)–27$(n)$. Read and write operations can then be performed on the selected row. The selection circuit includes a pair of selection flip-flops in each row. For example, the first row illustrated in FIG. 4 includes a first flip-flop FF1(1) and a second flip-flop FF2(1).

The illustrated flip-flops are of the "J cell" type shown in FIG. 3.4 of the above mentioned "Superconductive Devices." Each flip-flop is formed of a pair of parallel current paths. It is arranged that one of these paths is always superconductive. A current established in one superconductive path remains in that path even though the other path subsequently becomes superconductive. Cryotrons in each path may be controlled to divert the current from one path to the other. Thus the J cell flip-flop is a two state device, having a "set" state when current is flowing in a given path and a "reset" state when the current is flowing in the other path.

The flip-flop FF1(1), FIG. 4, for example, comprises a pair of current paths between a terminal 48(1) and a terminal 49(1). When the flip-flop current is flowing in the "upper" path, the flip-flop is said to be in the reset state. This is indicated in FIG. 4 by an arrow and the letter R. When the flip-flop current is flowing in the "lower" path, the flip-flop is in the set state as indicated by the arrow and the letter S.

A plurality of first flip-flops FF1(1)–FF1(*m*) form "match-indicating" flip-flops. These flip-flops are set prior to a search operation. In each row in which the stored word matches the interrogation word the match indicating flip-flop remains in the set state; however for stored words that do not match the interrogation word the match indicating flip-flops of the corresponding rows are reset. The match indicating flip-flops control the flow of a "select" current for sequential selection of the matching words as is more fully described hereinafter.

A plurality of second flip-flops FF2(1)–FF2(*m*) form "selection" flip-flops. These flip-flops are reset prior to a search operation. When a selection flip-flop is in the reset state the corresponding row is unselected for reading and writing operation. For example, if the flip-flop FF2(1) is in the reset state, the flip-flop current R through the control of a cryotron 53(1) renders the gate of this cryotron resistive and thus prevents word current flow in the read and write lines. During a select operation the set state of the match-indicating flip-flop of the first row which contains a matching word causes the select current to be diverted to set the selection flip-flop thus enabling reading and writing operations in that row.

It is pointed out that circuits which require a constant current and which provide alternate paths for the current may be connected in series to a single constant current source. Thus the row lines and the selection circuit flip-flops in each row are connected in series for the word current of that row. In the first row, for example, the terminal 48(1) of flip-flop FF1(1) is connected to the right hand ends of the row lines. Terminal 49(1) is connected to a terminal 50(1) of flip-flop FF2(1) and a terminal 67(1) is connected to the common return terminal 42. (It is noted that the rows of the memory could also be connected in series, however, for convenience of illustration separate word current input terminals **41(1)–41(*m*)** are shown.)

The operation of the associative memory system and further details of the structure thereof will be better understood from the following examples of operation. Assume as an initial condition that the flip-flops of the selection circuit are in the reset state. A reset current is applied to the reset control line 44, for example, by closing a switch 51 to a source of constant current. This reset current renders resistive the gates of a column of cryotrons **52(1)–52(*m*) in the shunt lines. This forces the word current in each row through the associative line since the write and read lines are resistive due to a plurality of cryotrons 53(1)–53(m)** the gates of which are resistive as a consequence of the reset states of selection flip-flops FF2(1)–FF2(*m*). The word currents in the associative lines render resistive a plurality of cryotrons **54(1)–54(*m*)** thus setting the flip-flops FF1(1)–FF1(*m*) by diverting the flip-flop currents to the set sides. The reset current is now removed.

With the word currents in the associative lines, with the flip-flops FF1(1)–FF1(*m*) in the set state and with the flip-flops FF2(1)–FF2(*m*) in the reset state, the system is ready for a search or an interrogate operation. A current is applied to the search control line 45, for example, by closing a switch 55 to a source of constant current. This renders resistive a plurality of cryotrons **56(1)–56(*m*) in a corresponding plurality of branch shunt lines 57(1)–57(*m*)** thus preventing flow of the word currents through the branch shunt lines.

The digit switches are then positioned to represent an interrogation word. As previously described, a digit switch is closed to pass a positive or downward current through the digit line to represent a "1" interrogation bit, it is closed to pass a negative or upward current through the digit line to represent a "0" interrogation bit and the digit switch is left open to mask or omit interrogation of the particular bit.

It will be recalled from the discussion of FIG. 2 that if a stored bit does not correspond to the interrogation bit, the associative line becomes resistive and the word current is diverted to the shunt line. Thus in the system of FIG. 4, if one or more bits of any stored word fail to match the corresponding bits of the interrogation word, the word current of that row is diverted to the shunt line. For example, if the bit stored in storage cell 40(1)(1) is different from the interrogation bit represented by the applied digit current to digit line 43(1), the digit current adds to the stored persistent current through the control of cryotron 23' thus making the gate of cryotron 23' resistive whereby the word current of the first row is diverted to the shunt line. The word current in the shunt line renders resistive the gate of a cryotron 66(1) and resets the match-indicating flip-flop FF1(1) of the row thus indicating that the word contained in the first row is a mismatch.

If however the word stored in the first row matches the interrogation word, the word current is not diverted to the shunt line but continues to flow in the associative line and the flip-flop FF1(1) remains in the set state. Thus if the first row word matches the interrogation word the match-indicating flip-flop FF1(1) is in the set state and the selection flip-flop FF2(1) is in the reset state. If the first row word does not match the interrogation word, the flip-flops FF1(1) and FF2(1) are in the reset state. The same result obtains for the other rows of the memory circuit. The digit currents, representing the interrogation word, are now turned off as is the search current.

A select operation is now performed by applying a select current pulse to a select line 58 which threads through the selection circuit. An alternate current path is provided for the select current by a bypass line 59. The select current flows in the select line until it encounters the first row which contains a matching word. The match-indicating flip-flop in that row causes the select current to be diverted to the bypass line so that only the first matching word is selected by the first select current pulse even though there are other matching words in subsequent rows.

For example, assume that the first row contains a nonmatching word and thus both flip-flops FF1(1) and FF2(1) are in the reset state. A cryotron 60(1) blocks the select current from the bypass line 59. The select current therefore flows through the gate of a cryotron 61(1), through the control of a cryotron 62(1) and thence down the select line to the selection flip-flop of the next row. The first row remains unselected for read and write operations due to the reset state of flip-flop FF2(1) and the consequent resistive condition of the gate of cryotron 53(1).

On the other hand, assume that the first row contains a matching word. In this case, flip-flop FF1(1) is in the set state with its current S flowing through the control of cryotron 61(1). (Flip-flop FF2(1) is in the reset state.) The consequent resistive condition of the gate of cryotron 61(1), due to the match-indicating flip-flop current S, causes the select current to be diverted through the gate of cryotron 60(1) and the control of a cryotron 63(1) to the bypass line 59 and thence to the common return terminal 42. (Thus the select current bypasses the match-indicating flip-flops of subsequent rows, the selection flip-flops of the subsequent rows remain reset, and therefore the subsequent rows remain unselected.) The diverted select current through the control of cryotron 63(1) causes the gate of this cryotron to become resistive. The selection flip-flop FF2(1) therefore assumes its set state. The gate of cryotron 53(1) now becomes superconductive to enable reading and writing operations. The gate of a cryotron 68(1) becomes resistive to block the flow of word current in the branch shunt line 57(1). In this way the first row which contains a matching word is selected for read and write operations while all subsequent rows which contain mtaching words remain unselected.

Read and write operations are performed as described hereinbefore in the description of FIG. 2, all bit positions of the selected row being read or written simultaneously. A control current applied to the write control line 46 causes the word current to flow in the write line of the selected row. A control current applied to the read control line 47 causes the word current to flow in the read line of the selected row. In the other (unselected) rows the word current flows through the shunt and shunt branch lines.

When read and write operations are performed the word current in the selected row resets the match-indicating flip-flop so that this row is not again selected by the next select current pulse. For example, assume that the first row is the selected row. When read and write operations are performed the word current flows through the control of a cryotron 64(1). The consequent resistive gate of cryotron 64(1) resets the match-indicating flip-flop FF1(1).

When read and write operations are completed in the first selected row a second select current pulse is applied to select the next row which contains a matching word. With flip-flop FF1(1) in its reset state the select current flows through the control of cryotron 61(1), the gate of cryotron 62(1) and thence down the select line to the second row. The select current renders the gate of cryotron 62(1) resistive and thus the selection flip-flop FF2(1) is reset. The gate of cryotron 53(1) becomes resistive and the first row is thus now unselected.

In the row containing the second matching word the match-indicating flip-flop will have been set during the search operation. Due to the set state of the match-indicating flip-flop, the select current is diverted to the bypass line thus causing the selection flip-flop to assume its set state to thereby select this row for read and write operations.

When read and write operations are completed in the row containing the second matching word, a third select current pulse is applied to select the row containing the third matching word, and so forth.

When all the rows containing matching words have been selected in sequence, as described above, the next select current pulse flows through the control of an "end" cryotron 65. The resistive condition of the gate of this cryotron may be detected to signal that the system is ready for another search or interrogate operation.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. In an associative memory system, a storage cell comprising: a digit line; first, second and third cryotrons, the gate of said first cryotron, the control of said second cryotron and the gate of said third cryotron being connected in series with said digit line; a fourth cryotron, the gate thereof being connected in parallel with the gate of said third cryotron; a branch circuit connected in parallel with the series connected gate of said first cryotron and control of said second cryotron, said branch circuit including the control of said fourth cryotron; a write line including the control of said first cryotron; an associative line including the gate of said second cryotron; a read line including the control of said third cryotron; a shunt line; means for selectively connecting said shunt line in parallel with said associative line; and means for selectively applying currents to said digit, write, associative and read lines.

2. In an associative memory system, the combination of: a row of normally superconductive loops for storing the bits of a word, one loop for each bit of said word; means for establishing a persistent current in each loop representing the corresponding bit of said word; first and second normally superconductive lines in said row forming alternative current paths; means for establishing a current in said first line, and means for comparing the bits of an interrogation word with the corresponding bits of the word stored in said row including means for applying a bit representing interrogation current to each of said loops to be interrogated whereby said interrogation current adds to said persistent current in a predetermined part of said loop when the bit stored in said loop and the corresponding interrogation bit are different, and means responsive to the sum of said persistent current and said interrogation current in said predetermined part of said loop for diverting the current in said first line to said second line.

3. In an associative memory system, the combination of: a row of normally superconductive loops for storing the bits of a word, one loop for each bit of said word; means for establishing a persistent current in each loop representing the corresponding bit of said words; first and second normally superconductive lines in said row forming alternative current paths; means for establishing a current in said first line; and means for comparing an interrogation word and the word stored in said row including means for applying a bit representing interrogation current to each of said loops which corresponds to a bit of said interrogation word whereby said interrogation current adds to said persistent current in a predetermined part of said loop when the bit stored in said loop and the corresponding interrogation bit are different and subtracts from said persistent current in said predetermined part of said loop when the bit stored in said loop and the corresponding interrogation bit are similar, and cryogenic means responsive to the sum of said persistent current and interrogation current in said predetermined part of at least one of said loops for rendering said first line resistive.

4. In an associative memory system, the combination of: a row of storage cells for storing the bits of a word; first and second normally superconductive lines forming alternative current paths; a circuit having a set state and a reset state; means for continually applying an operating current to said circuit; means for establishing a current in said first line; means responsive to said current in said first line for setting said circuit; means for comparing an interrogation word with the word stored in said cells including means for applying representations of the bits of said interrogation word to said storage cells and manifesting means in each cell for indicating a mismatch between the bit in said cell and the correspondingg interrogation bits; means responsive to the mismatch indicating condition of said manifesting means for diverting said current from said first line to said second line; means responsive to current in said second line for resetting said circuit; reading and writing means for reading from and writing into said row of cells; means for applying a select signal to said circuit; and means responsive to said select signal and the set state of said circuit for enabling said reading and writing means.

5. In an associative memory system, the combination of: a row of storage cells for storing the bits of a word; first and second lines forming alternative current paths; a first circuit having a set state and a reset state; a second circuit having a set state and a reset state; means for continually applying an operating current to said first and second circuits; means for resetting said first circuit and said second circuit; reading and writing means for reading from and writing into said row of storage cells; means responsive to the reset state of said second circuit for disabling said reading and writing means; means for establishing a current in said first line; means responsive to current in said first line for setting said first circuit; means for representing an interrogation word; means for comparing said interrogation word with the word stored in said cells; means operable in the event of a match between said interrogation word and the word stored in said cells for allowing the continuance of said current in said first line; and means operable in response to the set state of said first circuit for setting said second circuit for enabling said reading and writing means.

6. In an associative memory system, the combination of: a row of storage cells for storing the bits of a word; first and second lines forming alternative current paths; a first circuit having a set state and a reset state; a second circuit having a set state and a reset state; means for continually applying an operating current to said first and second circuits; means for resetting said first circuit and said second circuit; reading and writing means for reading from and writing into said row of storage cells; means responsive to the reset state of said second circuit for disabling said reading and writing means; means for establishing a current in said first line; means responsive to current in said first line for setting said first circuit; means for representing an interrogation word; comparison means operable in the event of a match between said interrogation word and the word stored in said cells for allowing the continuance of said current in said first line and operable in the event of a mismatch between said interrogation word and the word stored in said cells for diverting said current in said first line to said second line; means responsive to current in said second line for resetting said first circuit; means for applying a select signal to said first circuit; and means responsive to the set state of said first circuit for directing said select signal to set said second circuit for enabling said reading and writing means.

7. In an associative memory system, the combination of: a row of storage cells for storing the bits of a word; first and second lines forming alternative current paths; a first circuit having a set state and a reset state; a second circuit having a set state and a reset state; means for continually applying an operating current to said first and second circuits; means for resetting said first circuit and said second circuit; reading and writing means for reading from and writing into said row of storage cells; means responsive to the reset state of said second circuit for disabling said reading and writing means; means for establishing a current in said first line; means responsive to current in said first line for setting said first circuit; means for representing an interrogation word; comparison means operable in the event of a match between said interrogation word and the word stored in said cells for allowing the continuance of said current in said first line and operable in the event of a mismatch between said interrogation word and the word stored in said cells for diverting said current in said first line to said second line; means responsive to current in said second line for resetting said first circuit; means for applying a first select signal to said first circuit; means responsive to the set state of said first circuit for directing said select signal to set said second circuit for enabling said reading and writing means; means for performing reading and writing operations; means operable during reading and writing operations for resetting said first circuit; means for applying a second select signal; and means responsive to the reset state of said first circuit for directing said second select signal for resetting said second circuit for disabling said reading and writing means.

8. An associative memory system comprising: a plurality of storage cells arranged in rows and columns, each row of cells storing a word and each column corresponding to a bit position; an associative line and a shunt line in each row; a selection circuit including a match-indicating flip-flop and a selection flip-flop in each row, each flip-flop having a set and a reset state, each flip-flop initially being in the reset state; means for continually applying an operating current to said match-indicating and selection flip-flops; means for establishing a word current in the associative line of each row; means responsive to the word currents in the associative lines for setting the match-indicating flip-flops; means for representing the bits of an interrogation word; means for applying each bit representation of said interrogation word to a selected column of said storage cells; means operable in the event of a mismatch between the applied bit representation and a bit stored in a cell of a selected column for diverting the word current in the associative line to the shunt line of the corresponding row; means responsive to the word current in a shunt line for resetting the match-indicating flip-flop of the corresponding row; means for applying a first select signal to the match-indicating flip-flops in series; a bypass line in said selection circuit; means responsive to the first match-indicating flip-flop in the set state encountered by said first select signal for diverting said first select signal to said bypass line; means responsive to the diverted first select signal for setting the selection flip-flop in the row corresponding to said first match-indicating flip-flop; reading means in each row for reading the word stored therein; and means responsive to the set state of said selection flip-flop for enabling the reading means of the corresponding row.

9. An associative memory system comprising: a plurality of storage cells arranged in rows and columns, each row of cells storing a word and each column corresponding to a bit position; an associative line and a shunt line in each row; a selection circuit including a match-indicating flip-flop and a selection flip-flop in each row, each flip-flop having a set and a reset state, each flip-flop initially being in the reset state; means for continually applying an operating current to said match-indicating and selection flip-flops; means for establishing a word current in the associative line of each row; means responsive to the word currents in the associative lines for setting the match-indicating flip-flops; means for representing the bits of an interrogation word; means for applying each bit representation of said interrogation word to a selected column of said storage cells; means operable in the event of a mismatch between the applied bit representation and a bit stored in a cell of a selected column for diverting the word current in the associative line to the shunt line of the corresponding row; means responsive to the word current in a shunt line for resetting the match-indicating flip-flop of the corresponding row; means for applying a first select signal to the match-indicating flip-flops in series; a bypass line in said selection circuit; means responsive to the first match-indicating flip-flop in the set state encountered by said first select signal for diverting said first select signal to said bypass line; means responsive to the diverted first select signal for setting the selection flip-flop in the row corresponding to said first match-indicating flip-flop; reading means in each row for reading the word stored therein; means responsive to the set state of said selection flip-flop for enabling the reading means of the corresponding row; and means operable during a reading operation for resetting the match-indicating flip-flop of the corresponding row.

10. An associative memory system comprising: a plurality of storage cells arranged in rows and columns, each row of cells storing a word and each column corresponding to a bit position; an associative line and a shunt line in each row; a selection circuit including a match-indicating flip-flop and a selection flip-flop in each row, each flip-flop having a set and a reset state, each flip-flop initially being in the reset state; means for continually applying an operating current to said match-indicating and selection flip-flops; means for establishing a word current in the associative line of each row; means responsive to the word currents in the associative lines for setting the match-indicating flip-flops; means for representing the bits of an interrogation word; means for applying each bit representation of said interrogation word to a selected column of said storage cells; means operable in the event of a mismatch between the applied bit representation and a bit stored in a cell of a selected column for diverting the word current in the associative line to the shunt line of the corresponding row; means responsive to the word current in a shunt line for resetting the match-indicating flip-flop of the corresponding row; means for applying a first select signal to the match-indicating flip-flops in series; a bypass line in said selection circuit; means responsive to the first match-indicating flip-flop in the set state encountered by said first select signal for diverting said first select signal to said bypass line; means responsive to the diverted first select signal for setting the selection flip-flop in the row corresponding to said first match-indicating flip-flop; reading and writing means in each row for reading from and writing into the storage cells of the row; means responsive to the set state of said selection flip-flop for enabling the reading and writing means of the corresponding row; and means operable in response to reading and writing operations for resetting the match-indicating flip-flop of the corresponding row.

11. An associative memory system comprising: a plurality of storage cells arranged in rows and columns, each row of cells storing a word and each column corresponding to a bit position; an associative line and a shunt line in each row; a selection circuit including a match-indicating flip-flop and a selection flip-flop in each row, each flip-flop having a set and a reset state, each flip-flop initially being in the reset state; means for continually applying an operating current to said match-indicating and selection flip-flop; means for establishing a word current in the associative line of each row; means responsive to the word currents in the associative lines for setting the match-indicating flip-flops; means for representing the bits of an interrogation word; means for applying each bit representation of said interrogation word to a selected column of said storage cells; means operable in the event of a mismatch between the applied bit representation and a bit stored in a cell of a selected column for diverting the word current in the associative line to the shunt line of the corresponding row; means responsive to the word current in a shunt line for resetting the match-indicating flip-flop of the corresponding row; means for applying a first select signal to the match-indicating flip-flops in series; a bypass line in said selection circuit; means responsive to the first match-indicating flip-flop in the set state encountered by said first select signal for diverting said first select signal to said bypass line; means responsive to the diverted first select signal for setting the selection flip-flop in the row corresponding to said first match-indicating flip-flop; reading means in each row for reading the word stored therein; means responsive to the set state of said selection flip-flop for enabling the reading means of the corresponding row; means operable in response to a reading operation for resetting the match-indicating flip-flop of the corresponding row; and means for applying additional select signals for enabling in turn the reading means of each row containing a word matching said interrogation word.

12. In a memory system, the combination of: a plurality of storage cells arranged in rows and columns, each row of cells adapted to store a data word and each column corresponding to a data bit position; a digit line in each column; a write line, an associative line, a read line and a shunt line in each row forming alternate paths for an operating current; each of said storage cells comprising first, second, third and fourth cryotrons, the gate of said first cryotron, the control of said second cryotron and the gate of said third cryotron being connected in series with the respective digit line, the gate of said fourth cryotron being connected in parallel with the gate of said third cryotron, the write line of each row including the controls of said first cryotrons, the associative line of each row including the gates of said second cryotrons, the read line of each row including the controls of said third cryotrons, each of said storage cells further including a branch circuit connected in parallel with the series connected gate of said first cryotron and control of said second cryotron, said branch circuit including the control of said fourth cryotron, said branch circuit and said series connected gate and control of said first and second cryotrons forming a persistent current storage loop, said branch circuit and said series connected gate and control of said first and second cryotrons having substantially equal inductances; means for establishing persistent currents in said storage loops of the cells of each of said rows representative of data bits; means for initially directing said operating current through said associative line of each row; means for applying interrogation currents to selected ones of said digit line representative of the bits of an interrogation word, said second cryotron of each of said storage cells being operable in response to the sum of an interrogation current and a stored persistent current through the control thereof for rendering the gate thereof resistive whereby said operating current is diverted from the corresponding associative line.

13. In a memory system, the combination of: a plurality of storage cells arranged in rows and columns, each row of said cells adapted to store a data word, each column corresponding to a data bit position; a digit line in each column; a plurality of row lines including a write line, an associative line, a read line and a shunt line in each row forming alternate paths for a word current; a selection circuit including a match-indicating flip-flop and a selection flip-flop in each row, each flip-flop having a set and a reset state; means for continually applying a row current to the row lines and the match-indicating and selection flip-flops of each row; reset means for initially directing said word current through the associative line of each row; means responsive to word current in the associative line for setting the match-indicating flip-flop of the row; means for performing an interrogation operation including means for applying data bit representing currents to selected ones of said digit lines; means operable in the event of a mismatch between the applied data bit representing current and the data bit stored in a storage cell for diverting said word current from the associative line to the shunt line of the row; means responsive to word current in a shunt line for resetting the match-indicating flip-flop of the row; a select line intercoupling said match-indicating flip-flops; means for applying a select signal to said select line; a bypass line in said selection circuit; means responsive to the first match-indicating flip-flop in the set state encountered by said select signal for diverting said select signal from said select line to said bypass line; means responsive to the diverted select signal for setting the selection flip-flop in the row containing said first encountered set match-indicating flip-flop; a shunt bypass line forming an alternate path for word current directed to said shunt line; means responsive to the set state of said selection flip-flop for diverting word current from said shunt bypass line; selectively operable write control means for diverting word current from said associative, read and shunt lines whereby said word current is directed through said write line in joint response to said write control means and the set state of said selection flip-flop of the row for enabling writing into the storage cells of the row; selectively operable read control means for diverting word current from said write, associative and shunt lines whereby said word current is directed through said read line in joint response to said read control means and the set state of said selection flip-flop of the row for enabling reading of the data in the storage cells of the row; and means responsive to word current in said write and read lines for resetting the match-indicating flip-flop of the row.

References Cited by the Examiner

UNITED STATES PATENTS

| | | | |
|---|---|---|---|
| 2,973,508 | 2/1961 | Chadurjian | 340—172.5 |
| 3,031,650 | 4/1962 | Koerner | 340—172.5 |
| 3,167,748 | 1/1965 | Bremer et al. | 340—173.1 |
| 3,191,156 | 6/1965 | Roth | 340—172.5 |
| 3,191,159 | 6/1965 | Young | 340—173.1 |
| 3,196,410 | 7/1965 | Davies | 340—173.1 |
| 3,199,082 | 8/1965 | Haibt | 340—172.5 |

ROBERT C. BAILEY, *Primary Examiner.*

G. D. SHAW, *Assistant Examiner.*